Fig. 1

Inventors:
Rolf Eberhardt
Günter Nüßlein
Helmut Rupp
By A.D.Adams
Attorney

Sept. 29, 1942.  R. EBERHARDT ET AL  2,297,543
DEVICE FOR AMPLIFYING DIRECT VOLTAGE OR CURRENT
Filed Aug. 3, 1939  11 Sheets-Sheet 3

Inventors:
Rolf Eberhardt
Günter Nüßlein
Helmut Rupp
By A. D. Adams
Attorney

Sept. 29, 1942.   R. EBERHARDT ET AL   2,297,543
DEVICE FOR AMPLIFYING DIRECT VOLTAGE OR CURRENT
Filed Aug. 3, 1939   11 Sheets-Sheet 4

Fig. 5

Inventors:
Rolf Eberhardt
Günter Nüßlein
Helmut Rupp
By A.D. Adams
Attorney

Sept. 29, 1942.       R. EBERHARDT ET AL       2,297,543
         DEVICE FOR AMPLIFYING DIRECT VOLTAGE OR CURRENT
                Filed Aug. 3, 1939        11 Sheets-Sheet 6

Fig. 7

Inventors:
Rolf Eberhardt
Günter Nüßlein
Helmut Rupp
By A. D. Adams, Attorney

Sept. 29, 1942.   R. EBERHARDT ET AL   2,297,543
DEVICE FOR AMPLIFYING DIRECT VOLTAGE OR CURRENT
Filed Aug. 3, 1939   11 Sheets-Sheet 7

Inventors:
Rolf Eberhardt
Günter Nüßlein
Helmut Rupp
By A.D.Adam
Attorney

Sept. 29, 1942.  R. EBERHARDT ET AL  2,297,543
DEVICE FOR AMPLIFYING DIRECT VOLTAGE OR CURRENT
Filed Aug. 3, 1939   11 Sheets-Sheet 8

Inventors:
Rolf Eberhardt
Günter Nüßlein
Helmut Rupp
By A.D. Adams, Attorney

Fig. 12

Sept. 29, 1942.            R. EBERHARDT ET AL                    2,297,543
                DEVICE FOR AMPLIFYING DIRECT VOLTAGE OR CURRENT
                        Filed Aug. 3, 1939          11 Sheets-Sheet 10

Fig.13

Inventors:
Rolf Eberhardt
Günter Nüßlein
Helmut Rupp
By A.D.Adams,
   Attorney

Patented Sept. 29, 1942

2,297,543

UNITED STATES PATENT OFFICE 2,297,543

DEVICE FOR AMPLIFYING DIRECT VOLTAGE OR CURRENT

Rolf Eberhardt, Gunter Nüsslein and Helmut Rupp, Berlin, Germany; vested in the Alien Property Custodian Application August 3, 1939, Serial No. 288,236
In Germany October 9, 1937

5 Claims. (Cl. 179—171)

This invention relates to improvements in or relating to a device for amplifying direct voltage or current, preferably by means of tube amplifiers.

Following arrangements are well-known for this purpose:

1. Apparatus for amplification of direct voltage by means of vacuum tube amplifiers, the tubes being directly coupled. Such arrangements generally possess adjustable electrical means for adjusting the pointer of a meter connected to the output terminals of the apparatus to zero in case there is no voltage to be amplified. These arrangements have the disadvantage that due to fluctuations of the supply voltages or variations of the properties of the tubes direct voltage may be created on the one hand at the output terminals of the apparatus, even if the input terminals are open, i. e. the input D. C. voltage is zero so that the indicating instrument no longer indicates zero, and on the other hand the amplification factor may vary.

2. Apparatus for the amplification of the direct voltage by using means for converting D. C. voltage into A. C. voltage, and means for amplifying and rectifying said A. C. voltage. This apparatus also has the disadvantage that the amplification factor varies for the same reasons as mentioned before and further due to inconstancies in the operation of said converting and rectifying means.

3. Modifications of the apparatus according to 1 or 2, in which a constant amplification factor may be achieved by influencing a controlling mechanism by means of the output power, said mechanism being a part of a voltage divider which delivers a voltage, by means of which the D. C. voltage to be amplified is compensated. It is disadvantageous that a relatively long time is necessary for accomplishing a perfect compensation. Furthermore, the accuracy of the amplification is limited to a certain degree due to friction errors of the controlling mechanism. Finally, as the apparatus is highly sensitive, it is liable to be destroyed. Even if apparatus according to 1 is combined with a compensating device, then an output voltage may be generated if there is no D. C. voltage to be amplified. Therefore, the above mentioned adjustable means must be readjusted in order to reset the pointer to zero.

According to the invention, the beforementioned apparatus, comprising means for converting a D. C. voltage into an A. C. voltage and means for amplifying and for rectifying said A. C. voltage, is combined with means for feeding back the output voltage or a part of it delivered by the rectifying means to the input of the said converting means for compensating the D. C. voltage which is to be amplified to a certain remainder. The output of the rectifier is hereby fed back solely by electrical means and not by mechanical means, as is well-known.

The apparatus according to the invention has a high indicating speed, a more simple construction due to the absence of the controlling mechanism, a higher accuracy by avoiding friction, and a greater reliability.

The subject matter of the invention is more fully explained with reference to the accompanying drawings.

Figure 1:
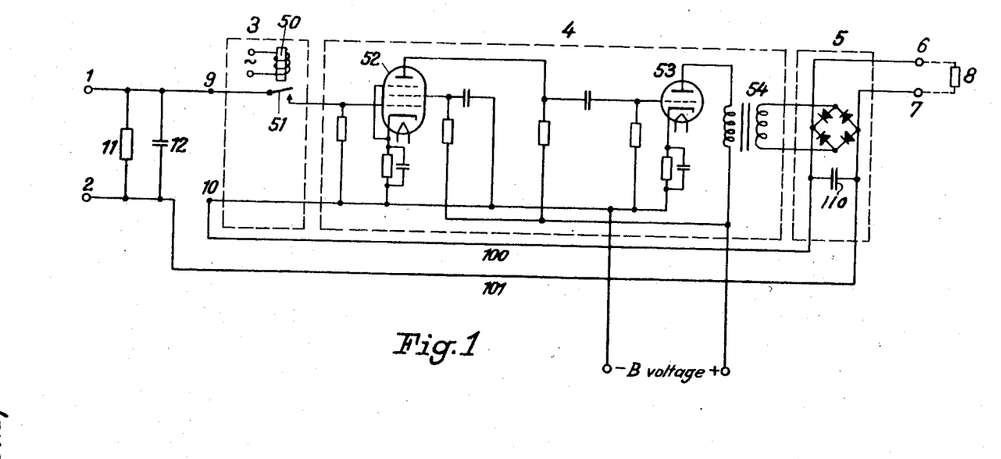
Fig. 1 shows a device for amplifying D. C. voltage.

The main idea of the subject matter of the invention is illustrated in Fig. 1. The D. C. voltage is connected to the input terminals 1, 2, it is converted in the convertor 3 from D. C. voltage into A. C. voltage and is amplified in the amplifier 4. The amplified A. C. voltage is rectified in the rectifier 5 and connected to the output terminals 6, 7 to which, for instance a measuring instrument, controlling member or the like 8 may be connected. The convertor 3 is shown as a vibrating system, comprising an electro-magnetic coil 50 excited by an alternating current and co-operating with a vibrating reed 51 acting as interrupter. The A. C. amplifier illustrated consists of two stages the first of which is a pentode tube 52, capacity resistance coupled to the second triode tube 53. The output of the amplifier 4 is fed to the rectifier 5 by means of a transformer 54, the rectifier being of a copper-oxide and of the full wave type. Condenser 110 serves for smoothing the rectified D. C. voltage. Convertor 3, amplifier 4 and rectifier 5 are limited by dotted lines. Furthermore, the output D. C. voltage is again fed back to the input along the leads 100, 101 and connected in opposition to the input voltage, thereby compensating the input voltage to a slight fraction. If, for instance a voltage of 1 V exists at the output and if the ratio of the output voltage of the rectifier across the terminals 6, 7 to the input voltage across the terminals of the converter 9, 10 has the value 1000, then a voltage of 1 mV exists between the points 9 and 10. Therefore, the input voltage across the input terminals 1, 2 is 1.001 V. In this example, the error in measurement of the arrangement is 0.001 V or 0.1%. If the amplification factor of the amplifier 4 changes by, for instance ±50%, i. e. that the ratio of the output voltage of the rectifier across the terminals 6, 7 to the input voltage across the terminals 9, 10 of the convertor has the value 1500 or 500, respectively, then the input voltage across the input terminals 1, 2 has the value 1.0007 or 1.002 V and the error in measurement now existing is 0.07%, to 0.2%. In the present case the voltage amplification is nearly equal to 1; only a current and power amplification take place.

In case of voltage amplification the resistance 11 across the terminals 1, 2 may be chosen relatively large, the condensor 12 also connected across the terminals 1 and 2, acting as a bypass for A. C. voltage components of the D. C. voltage to be amplified. If a current is to be amplified, then the current is conducted over the resistance 11 and the voltage drop created in it is amplified in the described manner. The current and power amplification is in this case practically equal to the ratio of input to output resistance.

Figure 2:
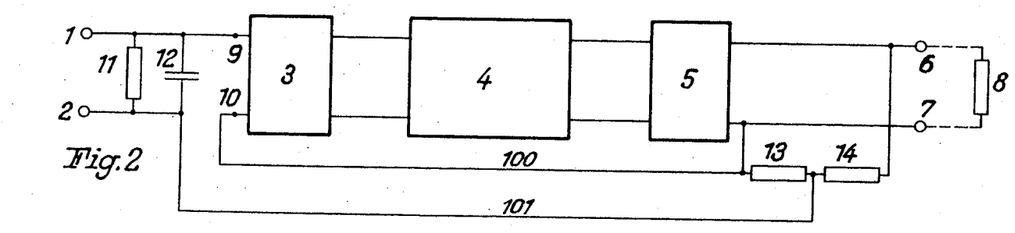
Figs. 2 and 3 show modifications of the invention according to Fig. 1 in a more schematic form.

Generally a voltage amplification, which is greater than 1, is demanded. In this case, a voltage divider 13, 14 is connected parallel to the output terminals 6, 7 as it is illustrated in Fig. 2 and in order to compensate the input voltage the voltage drop at the resistance 13 is used. Accordingly, the value of the voltage amplification is nearly equal to the resistance ratio $$\frac{R_{13}+R_{14}}{R_{13}}$$

The resistance 13 or 14 may also be replaced entirely or partly by a measuring instrument, controlling member or the like. For the sake of simplicity of the convertor 3, amplifier 4 and rectifier 5 are schematically indicated by means of solid black limiting lines.

When using a voltage divider at the output, the desired amplification factor may be exactly adjusted by decreasing the compensating voltage taken at the voltage divider 13, 14.

Figure 3:
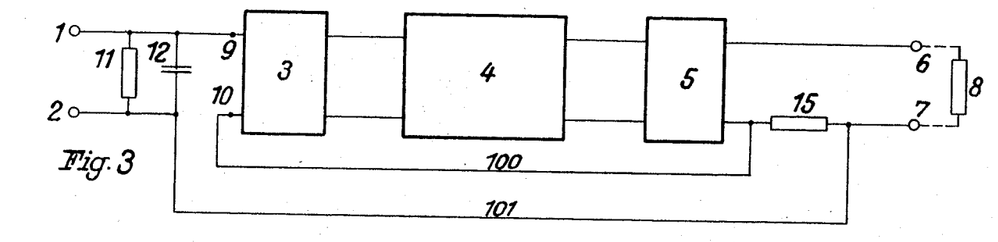

If, however, the output current should be in proportion to the input voltage, then according to Fig. 3 the compensating voltage is taken across the resistance 15, which is connected in series with the consumer 8 or is a part of same.

Figure 4:
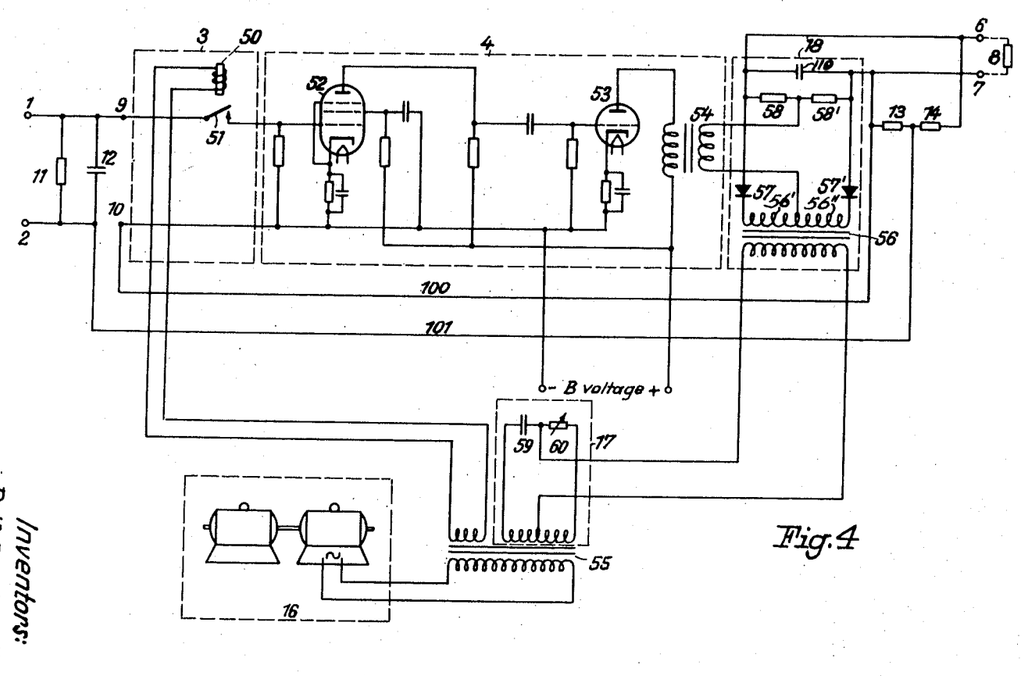
Fig. 4 shows a further modification of the subject matter of the invention.

The described wiring only operates faultlessly if a D. C. voltage to be amplified always has at the input terminals 1, 2 a certain polarity giving a degenerative action of the feedback path. If this voltage no longer exists or has the reverse polarity producing a regenerative action, then self-excitation of the amplifier takes place, as the fed back voltage does no longer compensate the input voltage. For avoiding this disadvantage an A. C. power source may be provided controlling the output frequency of the converting means and rectifying means may be provided which are responsive as well to the amplitude of the A. C. output voltage of the amplifier, as to the phase difference between the amplifier output voltage and the voltage of said power source. Then in accordance with the polarity of the input D. C. voltage the direction of the D. C. voltage received at the output, which is used for compensating purposes also changes and under no circumstances self-excitation can take place. This circuit is illustrated in Fig. 4. This figure shows the same elements 3 and 4 as Fig. 1. The rectifier 18 comprises two copper-oxide rectifiers 57, 57' which are arranged together with the centre tapped secondary of the transformer 56 and the series connected resistors 58, 58' forming a bridge. The diagonal of the bridge is connected to the secondary of the transformer 54 which feeds the output power of the amplifier 4 to said diagonal. The primary of the transformer 56, as well as the coil 50 of the convertor 3 are fed by the same A. C. power source, which consists in the illustrated example of a motor-generator 16, through the transformer 55 having two secondary windings, one of which feeds the coil 50 and the other the primary of the transformer 56. A capacity 110 and the electrical instrument 8 are parallel connected to the series connection of the resistors 58, 58'. 6 and 7 are the output terminals of the rectifier. If the transformer 54 delivers no voltage, i. e. if there is no input D. C. voltage across the terminals 1 and 2, then no D. C. voltage exists at the terminals 6, 7. This is due to the fact that each of the rectifiers 57, 57' only permits the passing of one half wave of the A. C. voltage existing across the secondary winding of the transformer 56, each half wave flowing in a circuit comprising one or the other winding 56, 56'' of the center-tapped secondary of the transformer 56, the secondary of transformer 54, the resistor 58 or 58', respectively, and the rectifier 57 or 57', respectively. Therefore each half wave of the alternating voltage produces a voltage drop across the resistor 58 or 58', respectively, thus producing an alternating voltage drop across the series connection of both resistors. This alternating voltage is short-circuited by the capacity 110 so that no voltage exists at the terminals 6, 7 if there is no input D. C. voltage across the terminals 1, 2 as stated above. If the transformer 54 delivers an A. C. voltage due to the presence of a D. C. voltage to be amplified, then this A. C. voltage is additive to the A. C. voltage delivered by one part of the secondary winding of the transformer 56—for instance 56'—and subtractive to the A. C. voltage across the other part 56'' of the secondary winding. In accordance with the sum of or the difference between these A. C. voltages the rectifiers 57, 57' produce D. C. voltage drops across the resistors 58, 58'. The D. C. voltage drop across the resistor 58 then exceeds the D. C. voltage drop across the resistor 58', and a D. C. flows from resistor 58 to the terminal 6, through the measuring instrument 8 to the terminal 7 and back to the resistor 58'. If the D. C. voltage which is to be amplified changes its polarity, then the phase of the A. C. voltage delivered by the transformer 54 is displaced about 180° with respect to the A. C. voltage feeding the transformer 56 and in accordance therewith the voltage of the transformer 54 is additive to the alternating voltage existing across the secondary winding 56'' and subtractive to the alternating voltage existing across the secondary winding 56'. Therefore the D. C. voltage across the resistor 58' exceeds the D. C. voltage across the resistor 58 so that the D. C. voltage at the terminal 6, 7 has changed its polarity. This mode of operation requires that the A. C. voltage of the transformer 56 has the same frequency as the A. C. voltage feeding the transformer 54, the frequency of the latter being determined by the vibratory frequency of the reed 51 of the convertor. For this reason the convertor 50, 51 and the rectifier 18 are to be controlled by the same A. C. power source. The one secondary of the transformer 55 feeding the primary of the transformer 56 is centre tapped and forms together with the condensor 59 and the variable resistor 60 a phase shifter 17 for compensating the phase shifts occurring in the system, for instance in the amplifier 4. The phase shifting means may be associated with any convenient element of the system, for instance with the convertor 3 or the amplifier 4.

Figure 5:
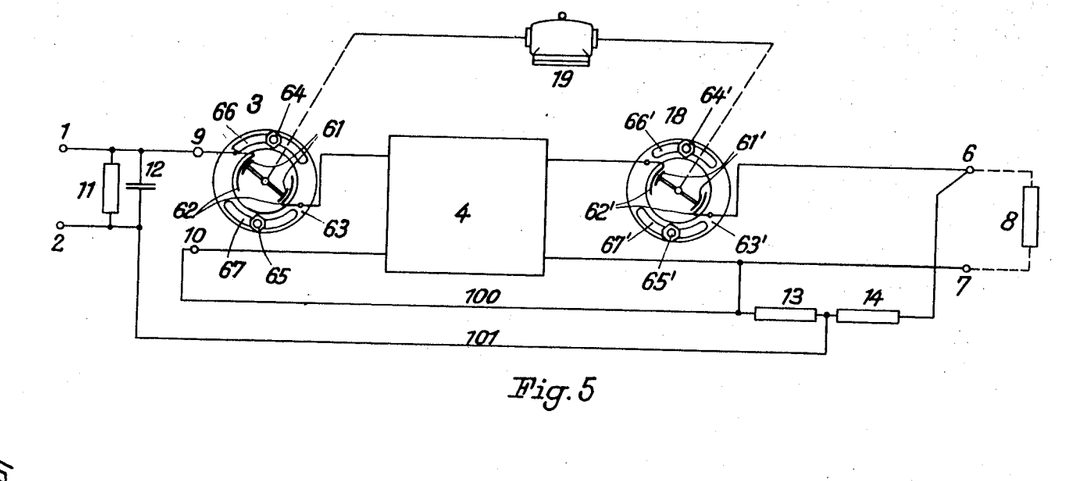
Figs. 5, 6, 7, 8, 12 and 13 show modifications of the subject matter of the invention shown in Fig. 4, in Figs. 7 and 8 parts being omitted.

Another modification of the inventive idea is illustrated in Fig. 5. In this case the convertor 3 is built as a rotating interrupter having rotating contacts 61, which are driven by a motor 19 for instance a synchronous motor, and fixed contacts 62 secured to the plate 63 which is shown as angularly adjustable with respect to its support (not shown) by means of screws 64, 65 screwed into the support and annular slots 66, 67 of the plate 63. A similar rotating contact arrangement which is driven by the motor 19 acts as rectifier 18, the parts corresponding to the like parts of the converter 3 being designated by the numerals 61', 62' . . . 67'. The mode of operation need not be more fully explained. The phase shift in the A. C. amplifier 4 can be taken into consideration, for instance by displacing the rotating contacts 61, 61' or the fixed contacts 62, 62' of the two contact devices relative to one another.

A rectifier 18 illustrated in Fig. 4 always delivers a slight remaining A. C. voltage due to slight dissymmetries of its circuit elements which should have equal electrical properties. In combination with a self-compensating amplifying device according to the invention, this remaining error is decreased in proportion to the size of the compensation factor. If, for instance the remaining D. C. voltage delivered by the rectifier is nearly 50% of the full output voltage, and the input voltage is compensated to 0.1%, then the remaining error at the output terminals 6, 7 is only 0.05%. In this way the wiring arrangements receive a lasting zero point security. This compensation of the dissymmetry only takes place, if in case of the wiring arrangements according to Figs. 1 to 5 the input terminals 1, 2 are galvanically connected with one another, in order to complete the feeding back circuit also even if no D. C. voltage to be amplified is connected to the terminals 1, 2. The resistance 11 is also provided for this purpose.

In the above described arrangements the electrical output is delivered by the amplifier 4. This necessitates in case of great electrical outputs a correspondingly expensive amplifier 4. In such cases it is advantageous to use grid-controlled rectifier tubes, the grids of which are controlled by the amplified alternating voltage and the output of which is taken from an A. C. power line. In this way it is possible to control by means of an amplifier 4, having small electrical output, large consumer ouputs.

Figure 6:
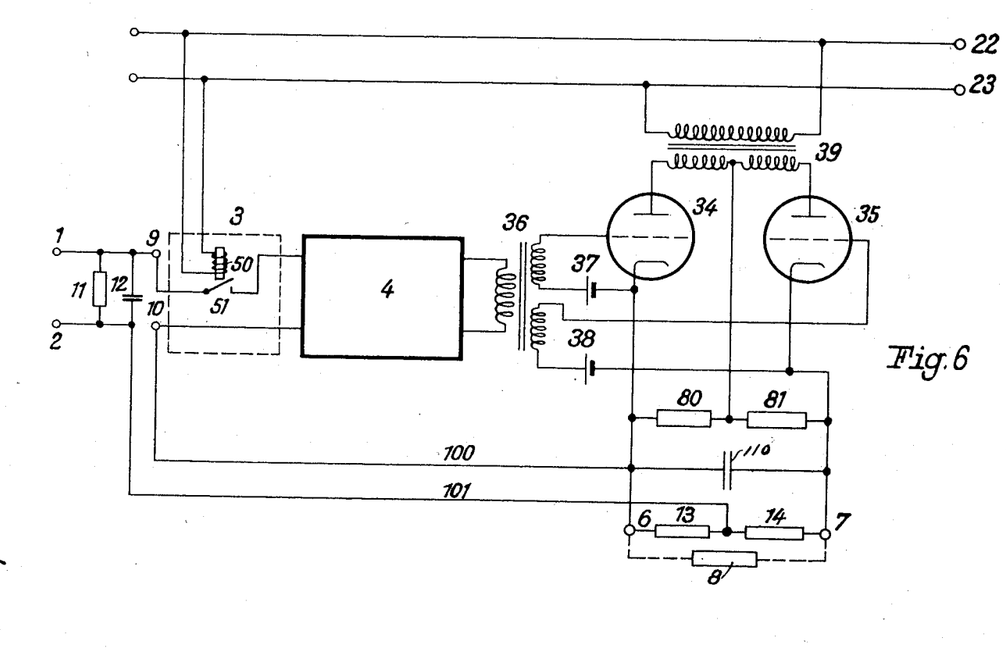

A special construction of a grid-controlled rectifier having electron tubes is illustrated in Fig. 6. Two electron tubes 34 and 35 are provided. The plate circuits of both tubes are fed in phase opposition by an A. C. power line 22, 23 by means of the transformer 39, so that the plate of the tube 34 is positive when the plate of the tube 35 has a negative potential, and contain each a resistor 80, 81, the two resistors being connected in series, thus forming a bridge. Said power line also controls the output frequency of the convertor 3, the structure of which is the same as shown in Figs. 1 and 4. The grids of the tubes are co-phasely controlled by the amplified A. C. voltage delivered by the amplifier 4 by means of the transformer 36 having two secondaries 37 and 38 are D. C. power sources for negative biasing of the grids. As the grids of both tubes are controlled by the same A. C. potential delivered by the transformer 36, only one of said tubes rectifies one half wave of the A. C. of the power line 22, 23. This is due to the fact that only one tube, for instance 34, becomes conductive, namely the one, in which the grid voltage, i. e., the voltage of the secondary of the transformer 36, and the plate voltage have an in-phase relation while simultaneously a phase difference of 180° exists between the grid voltage and the plate voltage of the other tube 35. If on the other hand the phase of the voltage delivered by the transformer 36 is displaced about 180° with respect to the phase of the voltage of the power supply line 22, 23, due to a change in polarity of the input D. C. voltage, then the tube 35 becomes conductive because the grid voltage and the plate voltage of that tube exclusively have now an in-phase relation. Also in this modification the control voltage of the transformer 36 and the voltage feeding the plate circuits of the tubes must have the same frequency and therefore the convertor 3 must be controlled by the same A. C. power source as the transformer 39. Due to the rectifying action of the tube 34 or 35, respectively, there will be produced at the resistor 80 or 81, respectively, and in consequence thereof at the terminals 6, 7 of the series connection of the resistors 80, 81 an output D. C. voltage changing its polarity as soon as the phase of the grid controlling A. C. voltage varies about 180°. Capacity 110 serves for smoothing the rectifying voltage.

The compensating voltage is taken at the voltage divider 13, 14 and is fed over the leads 100, 101 to the input in order to achieve a permanent constant proportionality between input and output voltage.

Figure 7:
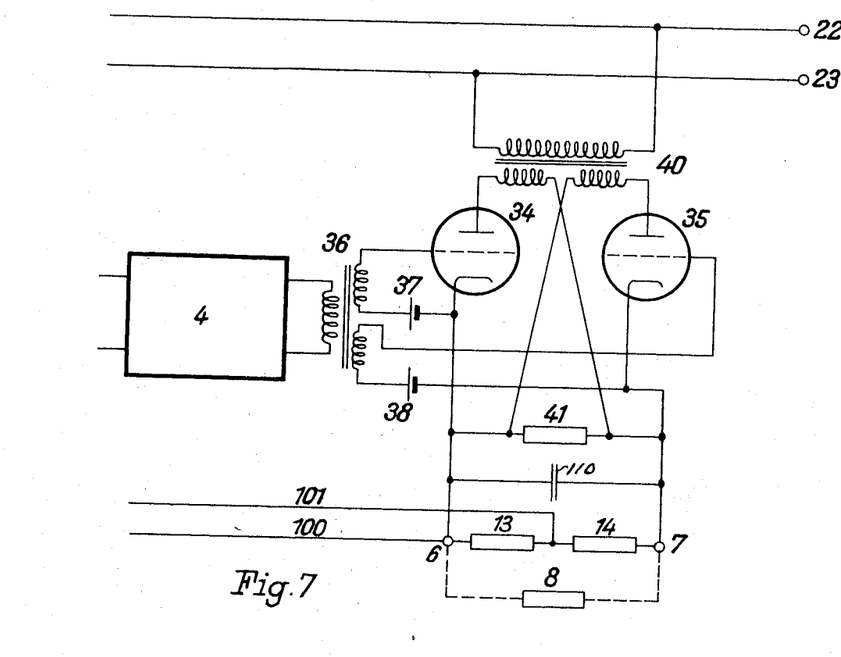

The wiring according to Fig. 7 is identical with the wiring according to Fig. 6 with the exception that a resistor 41 is common to both plate circuits of the tubes 34 and 35, thus producing at the terminals of said resistor an output D. C. voltage, changing its polarity as soon as the phase of the grid controlling A. C. voltage varies about 180°.

As in Figs. 6 and 7 the grids of the tubes 34 and 35 are controlled co-phasely, the transformer 36 may also be replaced by the customary condenser-resistance coupling.

Figure 8:
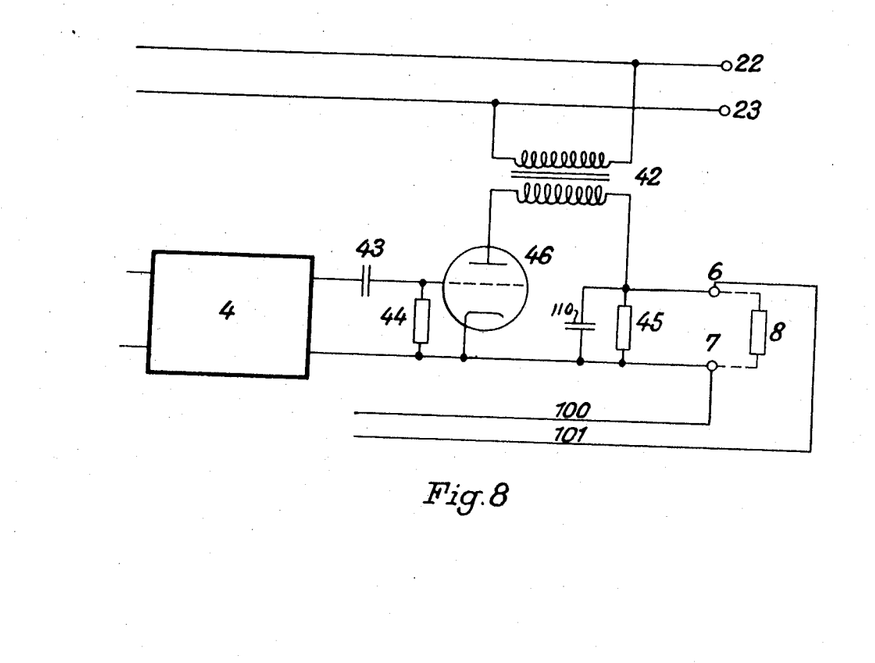

Another circuit for the rectifier which is more inexpensive is illustrated in Fig. 8. The plate circuit of the tube 46 is fed by the A. C. power line 22, 23 and by interconnection of the transformer 42 and contains a resistor 45. The grid of this tube is controlled by the amplifier 4 by means of a condensor-resistance-coupling 43 and 44. At first after switching on, a heavy plate current flows as the grid bias is zero, said current producing a strong voltage drop in the resistance 45. This voltage drop is given to the input over the leads 100, 101 in such manner that the output of the A. C. amplifier 4 delivers an alternating voltage, which endeavors to stop the plate current of the tube 46, i. e. that the phase of the grid A. C. potential is opposite to the phase of the plate A. C. voltage. This effect is magnified by an additional grid rectification, which creates a negative grid bias across the resistor 44. The plate current and, therefore, the voltage at the resistor 45 decreases to a small remainder. By means of a sufficiently high amplification factor of the amplifier 4 this remainder may be made so small that it lies below the measuring exactness. Therefore, also this arrangement is zero point secure. If the D. C. voltage to be amplified has the correct polarity, then a plate current flows, thereby producing an output voltage, but if the D. C. voltage to be amplified has the reverse polarity, the plate current of the tube is still more stopped.

A convertor which does not load the D. C. to be measured can be built up from a combination of resistances and periodically variable condensers. An arrangement of this kind is illustrated diagrammatically in Fig. 9. The D. C. to be amplified is applied to the input terminals 9, 10, and parallel to these terminals is a series-connected circuit consisting of a variable capacity 26, and a fixed resistance 25. The condenser consists of two metal plates 70, 71, one of which 71 is constructed as a flexible diaphragm. This diaphragm is disposed in front of the poles of a polarised magnet system consisting of a horse-shoe permanent magnet 72 carrying on its two limbs coils 73, 74, which are excited in series by the A. C. network 22, 23, in such a way that the magnetic field of the magnet 72 is amplified in one half cycle and weakened in the other half cycle. Consequently the flexible diaphragm 71 vibrates under the influence of the alternating potential applied to the terminals 22, 23, with the same frequency as the controlling A. C. potential. The condenser 26 is thus periodically varied in its capacity in rhythm with the control frequency. In this way charging current impulses are set up, which produce at the resistance 25 an A. C. potential drop that is passed to the A. C. amplifier. The advantage of such an arrangement is that the reversal takes place without power in respect of the D. C. source, for no permanent D. C. can flow through the condenser 2b; on the contrary the A. C. energy which is consumed in the resistance 25 is derived from the condenser supply.

Figure 9:
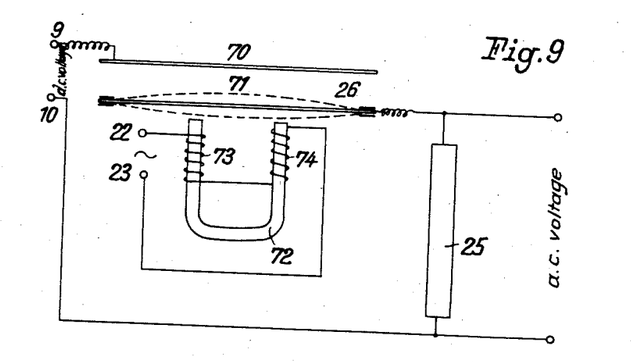
Fig. 9 is a detail of the apparatus according to the invention.
Figure 10:
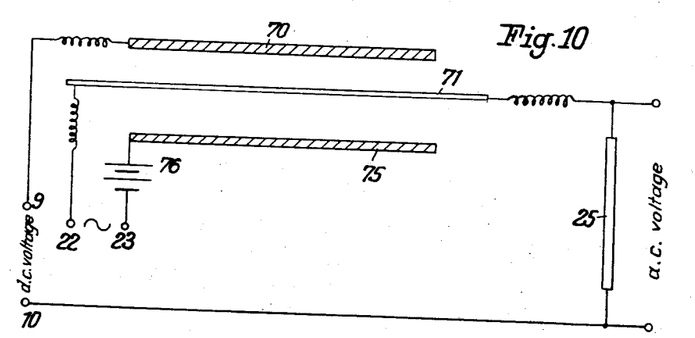
Figs. 10 and 11 are modifications of Fig. 9.

Fig. 10 illustrates a modification similar in principle to Fig. 9, but with the exception that the vibratable condenser plate 71 is electrostatically controlled. For this purpose a second condenser is used, consisting of the plate 71 and the rigid plate 75. The two plates 71, 75, are connected to the A. C. network 22, 23 by way of a battery 76, so that a direct potential is applied to the plates 71, 75, to which an alternating potential is superimposed. In this way the plate 71 vibrates the same frequency as the frequency of the controlling alternating potential. The battery 76 thus takes the place of the polarising magnet 72.

Figure 11:
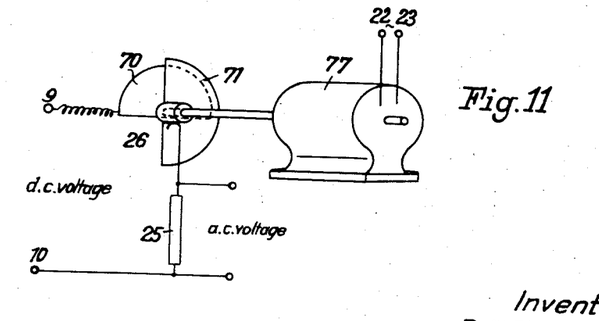

Fig. 11 shows a further modification similar in principle to Fig. 9. The condenser plates 70, 71 consist of two discs concentrically arranged and each formed as a semicircle, one of which being driven by a synchronous motor 77, supplied with energy from the alternating network 22, 23.

Duplicate utilisation of a single A. C. amplifier can be achieved by applying two D. C. potentials to a pair of convertors which are excited by the same control frequency but shifted in phase 90° to one another. The output potentials of the convertors are fed in common to the amplifier. The circuit according to Fig. 12, which is a modification of that shown in Fig. 4, gives an example of the duplicate utilisation of a single A. C. amplifier using a single controlling frequency. Two inputs 1, 2 and 1', 2' are provided, which each feed a chopper 51, 51', acting as convertors. These each act on a transformer 100, 100', whose secondaries are connected in series and feed the grid of the first amplifier tube 52. By using two separate transformers the two input circuits 1, 2 and 1', 2' are galvanically separated from one another and cannot influence one another. The coils 50, 50' of the choppers receive their controlling potential by way of two phase shifters 59, 60 and 59', 60' in such a way that the output A. C. potentials of the two choppers have a phase difference of 90°. The two phase shifters are fed from the A. C. network 22, 23 by way of a transformer 55 whose centrally tapped secondary is common to the two phase shifters. By way of phase rotating switching elements, capacities 102, 102' and resistances 103, 103', two rectifiers 18, 18' of the construction illustrated in Fig. 4 are controlled at the output in such a way that the rectifier 18 feeding the output terminals 6, 7 only responds to the alternating potentials that come from the chopper 51 associated with 1, 2, whilst the rectifier associated with 6', 7' only responds to alternating potentials that come from the chopper 51' associated with 1', 2'. The output of the A. C. amplifier 4 is transmitted through a transformer 104 with two separate secondaries, each of which is connected to a separate rectifier.

Figure 12:
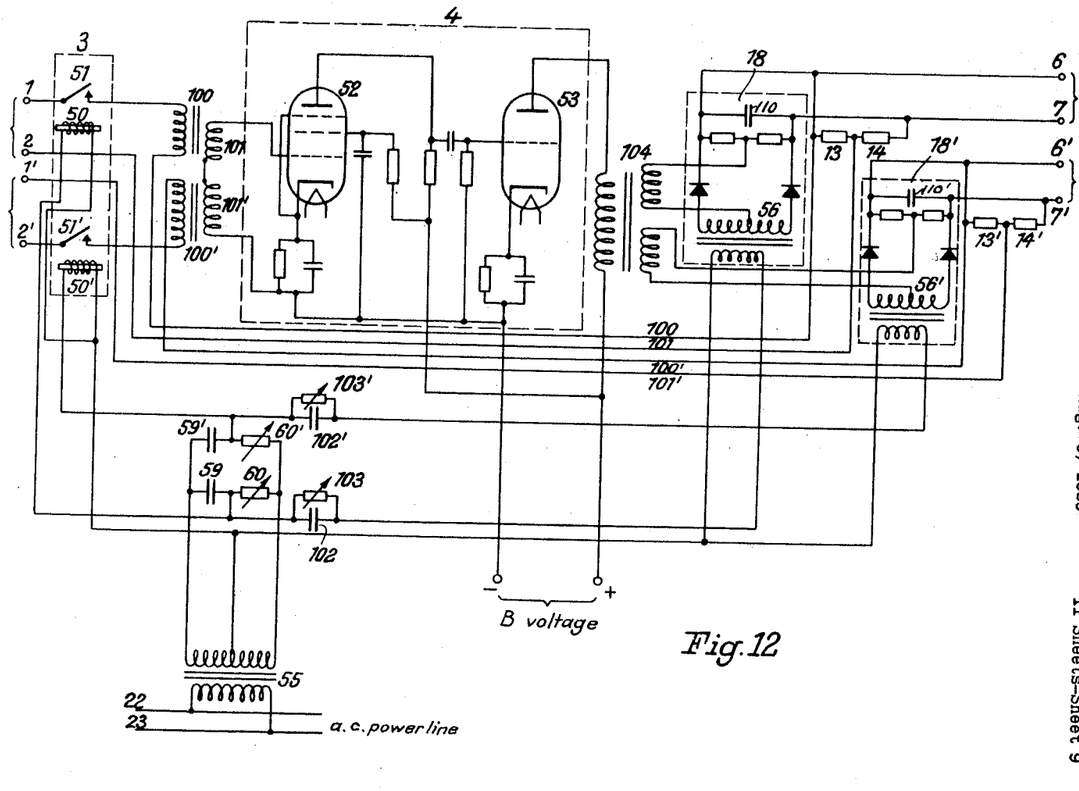

The potential for compensating the input potential 1, 2, is taken from the output 6, 7, by way of the voltage divider 13, 14, and the leads 100, 101. Similarly, the compensating potential is taken from 6', 7', by way of 13', 14', and 100', 101'. Another way of galvanically separating the two convertors is to provide two separate tube systems or one tube system with several control grids in the A. C. amplifier 4 in the first stage.

The multiple utilisation of a single A. C. amplifier can also be achieved by passing each D. C. potential to a separate convertor, the latter being controlled by a like number of control frequencies. In view of possible galvanic separation, as just described, all the alternating potentials are fed to a common A. C. amplifier. After the common amplification there are fundamentally two possible ways of effecting separate rectification; either a filter for the relevant frequency is connected in series before each rectifier, or else the whole frequency mixture is fed to a corresponding number of rectifiers. The different control frequencies should be so selected that the sum, differential and combined frequencies cannot cause mutual influence. A separate compensating lead is necessary for each direct current potential to be amplified.

Figure 13:
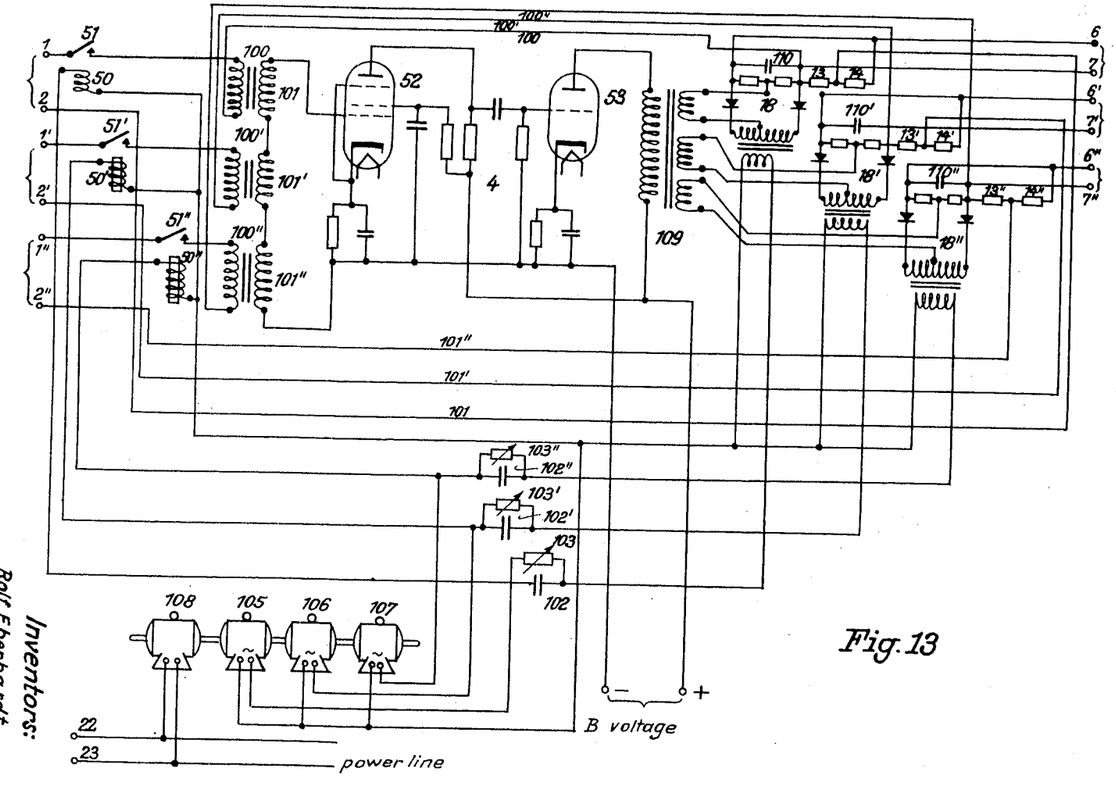

The circuit illustrated in Figure 13 shows the triple utilisation of an amplifier by using three different control frequencies they can be produced for example by three A. C. generators 105, 106, 107, which are driven by a machine 108.

In each of the inputs 1, 2, 1', 2', 1'', 2'', a chopper 51, 51', 51'', is used as convertor. They each act on a transformer 100, 100', 100'', whose secondaries 101, 101', 101'', are connected in series and feed the grid of the first tube 52.

Each chopper receives its control potential from one of the generators 105, 106, 107. Three rectifiers 18, 18', 18'', receive their control potentials at the output across phase-rotating switching elements 102, 103, 102', 103', 102'', 103''. The rectifier 18 feeding the output terminals 6, 7, receives the same control frequency as the chopper associated with 1, 2; the rectifier 18' feeding the output terminals 6', 7', receives the same control frequency as the chopper associated with 1', 2', etc.

The output of the amplifier 4 is transmitted across a transformer 109 with three separate secondaries, each of which is associated with one of the rectifiers.

A rectifier of the type illustrated is always controlled by two A. C. potentials. If these have the same frequency, their phase difference not amounting to 90°, a D. C. potential occurs at the output terminals (e.g. 6, 7). If however the two A. C. potentials are of different frequency a D. C. potential is no longer produced at the output terminals, but only an A. C. potential. This latter is undesirable and is therefore bridged by a condensor 110, 110', 110'' parallel to the output. The selective nature of the rectifier just described enables the rectifier associated with 6, 7, only to respond to that of the A. C. potential components leaving the amplifier 4 which comes from the chopper associated with 1, 2. The same applies for the other rectifiers and choppers. Analogously to the circuit of Figure 12, the feed-back of the compensation potentials takes place over three separate twin lines 100, 101; 100', 101'; 100'', 101''.

The two principles illustrated in Figures 12 and 13 can be combined together by transmitting two D. C. potentials in the manner illustrated in Figure 12 by means of a control frequency, Figure 13. This has the advantage of saving half the control generators.

Figure 14:
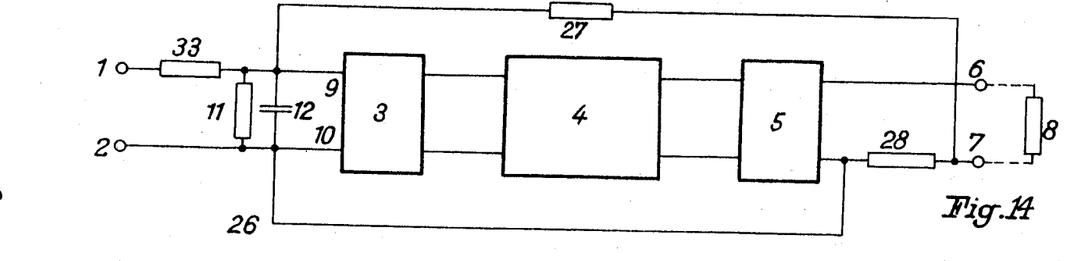
Fig. 14 shows a circuit diagram of a device for amplifying D. C. current.

The above mentioned principle of feeding a part of the output potential back to the input in such a way that the input potential is thereby practically compensated, can be utilised for the purpose of amplifying currents in the manner illustrated in Figure 14. Due to the output current a potential drop occurs at the resistance 28 which is fed back to the input 9, 10, of the convertor across the resistance 27. If the pair of input terminals 1, 2 of the amplifier is placed in a circuit, a potential drop at first occurs at the resistance 11 located at the input of the amplifier. This is converted into A. C. potential, amplified and rectified. The output current produces a potential drop in the resistance 28. On the other hand, the input terminals are still bridged by the series connection of the resistances 27 and 28. The partial current flowing across these resistances is practically compensated by the potential drop that occurs due to the output current in the resistance 28. Thus the potential drop at the input terminals 9, 10 breaks down except for a small amount which is necessary for controlling the amplifier. The amount of current amplification is practically equal to the ratio of the resistances $R_{27}/R_{28}$ when there is sufficiently great compensation. The input resistance thus decreases with the compensation, whereas it is increased with the voltage amplification connection in accordance with the previously described circuits. The decrease means a small internal consumption, which is always taken into account in ammeters.

In the circuit according to Figure 14 the output current is proportional to the input current. If proportionality is desired between the output voltage and the input current, the output can be connected up as indicated in Figure 15, in which by means of the potential divider 29, 30, a magnitude proportional to the output voltage is used for compensation.

Figure 15:
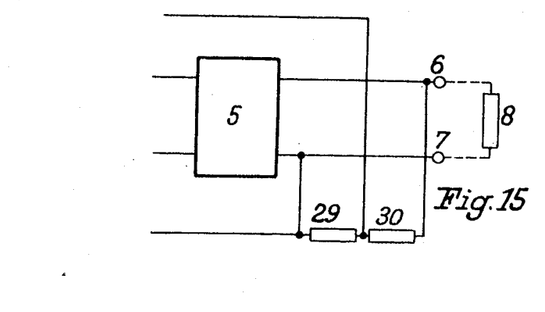
Fig. 15 is a modification of Fig. 14, parts being omitted.

In order to permit the compensation of the residual voltage supplied by a phase sensitive rectifier owing to dissymmetries upon short-circuiting of the input terminals 1, 2, of the circuits according to Figures 14, 15, a resistance 33 is provided in series with the input terminals of the current amplifier.

In the circuit arrangement for amplifying direct currents and also in the circuit for amplifying D. C. potentials, the following improvements may be made.

For special purposes one or more of the resistances, e.g. 13, 14, 15, 27, 28, 29, 30, lying in the return channel 100, 101, can be of non-linear construction. Such an arrangement is of particular importance in two cases. If the input potential of the amplifier is supplied by a transmitter apparatus possessing a non-linear characteristic, e.g. a thermocouple in the measurement of small high frequency currents, by using a switching element with the same non-linearity in the return channel the output potential or the output current at the consumer 8 can be made again linearly dependent upon the primary magnitudes, e.g. the high frequency current. On the other hand, by inserting a non-linear switching element in the return channel a certain desired characteristic of the scale of the consumer 8 can be achieved, e. g. a quadratic or logarithmic graduation.

As the degree of amplification of the A. C. amplifier 4 increases so do the difficulties of avoiding self-excitation of the whole circuit. If on the other hand the degree of amplification of the amplifier is made substantially constant in known manner by a negative feedback, it can be made smaller and yet stil retain adequate constancy of the D. C. amplifier. In the negative feedback of the amplifier 4 the convertor 3 can also be taken with consideration, in order to render less effective temporary variations of its efficiency.

Figure 16:
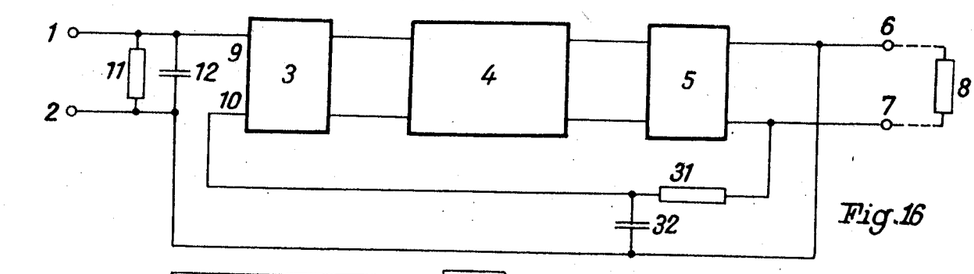
Fig. 16 is a modification of Fig. 2.

To prevent incorrect measurements due to the entry of A. C. potentials or currents into the amplifier by way of the amplifier, it is advisable to provide in the amplifier input electrical filters which render the disturbing frequencies ineffective. In the simplest case the condenser 12 is used for this purpose; a better effect is given by wave-band filters of known arrangement. According to Figure 16 however one or more filter elements can be provided in the return channel, consisting of resistances 31 and condensers 32, or the resistances 31 can be replaced by inductances. This arrangement can be so dimensioned that the measuring instrument or regulating element 8 has a shorter setting time. Thus if a potential is applied to the input 1, 2, there is at first no compensation, and the final stage will give a very high output. This means a powerful impulse for the element 8. Only after a period, dependent on the time constants of the member 31, 32, is the input potential compensated, and the final stage then gives the output corresponding to the normal degree of amplification. If the input potential is reduced the same effect occurs in the opposite direction. Thus the time constants of the return channel are conveniently tuned to the attenuation of the element 8. Figure 16 corresponds to Figure 1; in the other circuits given the filter members will be provided as required.

The temperature errors of an associated element 8 can be compensated by an opposite temperature dependency of the degree of amplification; this is possible for a temperature error of a transmitting instrument intended for connection to the terminals 1, 2. This compensation is achieved by making one or more of the resistances 13, 14, 15, 27, 28, 29, 30, temperature-dependent.

The amplification of variable D. C. potentials, i. e. D. C. potentials with superimposed A. C. potentials, or of A. C. potentials alone down to zero frequency, is directly possible with the proposed circuit arrangement, with a proper choice of the control frequency for the convertor, the time constants of the rectifier loading and the return channel, and the cutoff frequency of the input filter. This also applies to the amplification of currents.

The purpose and the functions of the phase-sensitive rectifiers referred to in the foregoing and indicated in Figs. 4, 6, 7 and 8 are described in "Electronics" of March, 1938, page 28.

What is claimed is:

1. A device for amplifying a D. C. voltage comprising, in combination, a periodically operated interrupter converting a D. C. voltage to an A. C. voltage; means amplifying said A. C. voltage and means rectifying said A. C. voltage; means feeding back a part of the output voltage of the rectifying means to the input of said converting means for partly compensating the D. C. voltage which is to be amplified, an A. C. power source controlling the output frequency of said converting means; said rectifying means being periodically conductive or non-conductive in synchronism with said interrupter thereby responding both to the amplitude of the A. C. output voltage of the amplifier and the phase difference between the amplifier output voltage and the voltage of said power source.

2. A device for amplifying a D. C. voltage comprising, in combination, an alternating current driven interrupter converting a D. C. voltage to an A. C. voltage; means amplifying said A. C. voltage and means rectifying said A. C. voltage; means feeding back a part of the output voltage of the rectifying means to the input of said converting means for partly compensating the D. C. voltage which is to be amplified; an A. C. power source controlling the output frequency of said converting means; said rectifying means being responsive both to the amplitude of the A. C. output voltage of the amplifier and the phase difference between the amplifier output voltage and the voltage of said power source; said rectifying means consisting of two grid controlled rectifier tubes, the grids of which are negatively biased and controlled co-phasally by the amplified A. C. voltage; the plate circuits of both tubes being fed in phase opposition by said A. C. power line and containing each a resistor; the two resistors being connected in series; thereby producing at the terminals of said series connection an output D. C. voltage changing its polarity as soon as the phase of the grid controlling A. C. voltage varies about 180°.

3. A device for amplifying a D. C. voltage comprising, in combination, an alternating current driven interrupter converting a D. C. voltage to an A. C. voltage; means amplifying said A. C. voltage and means rectifying said A. C. voltage; means feeding back a part of the output voltage of the rectifying means to the input of said converting means for partly compensating the D. C. voltage which is to be amplified; an A. C. power source controlling the output frequency of said converting means; said rectifying means being responsive both to the amplitude of the A. C. output voltage of the amplifier and the phase difference between the amplifier output voltage and the voltage of said power source; said rectifying means consisting of two grid controlled rectifier tubes, the grids of which are negatively biased and controlled co-phasally by the amplified A. C. voltage; the plate circuits of both tubes being fed in phase opposition by said A. C. power line; a resistor common to both plate circuits being provided, thereby producing at the terminals of said resistor an output D. C. voltage changing its polarity as soon as the phase of the grid controlling A. C. voltage varies about 180°.

4. A device for amplifying a D. C. voltage comprising, in combination, an alternating current driven interrupter converting a D. C. voltage to an A. C. voltage; means amplifying said A. C. voltage and means rectifying said A. C. voltage; means feeding back a part of the output voltage of the rectifying means to the input of said converting means for partly compensating the D. C. voltage which is to be amplified; an A. C. power source controlling the output frequency of said converting means; said rectifying means being responsive both to the amplitude of the A. C. output voltage of the amplifier and to the phase difference between the amplifier output voltage and the voltage of said power source; said rectifying means consisting of a single grid controlled rectifier tube the grid of which is controlled by the amplified A. C. voltage; the plate circuit being fed by said A. C. power line and containing a resistor, thereby producing at the terminals of said resistor an output D. C. voltage the value of which is correct or zero, if the grid controlling A. C. voltage varies about 180°.

5. A device for amplifying a D. C. voltage comprising, in combination, an alternating current driven interrupter converting a D. C. voltage to an A. C. voltage; means amplifying said A. C. voltage and means rectifying said A. C. voltage; means feeding back a part of the output voltage of the rectifying means to the input of said converting means for partly compensating the D. C. voltage which is to be amplified; an A. C. power source controlling the output frequency of said converting means, said rectifying means consisting of grid controlled rectifier tubes the grids of which are controlled by the amplified alternating voltage and the output of which is supplied by said A. C. power source.

R. EBERHARDT.
G. NÜSSLEIN.
H. RUPP.